E. SURCOUF.
MOTOR ROAD VEHICLE.
APPLICATION FILED FEB. 29, 1908.
914,201.
Patented Mar. 2, 1909.
4 SHEETS—SHEET 1.
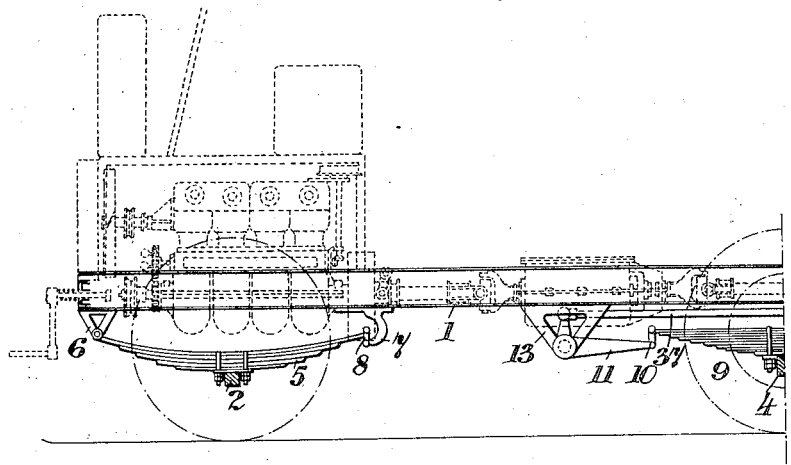
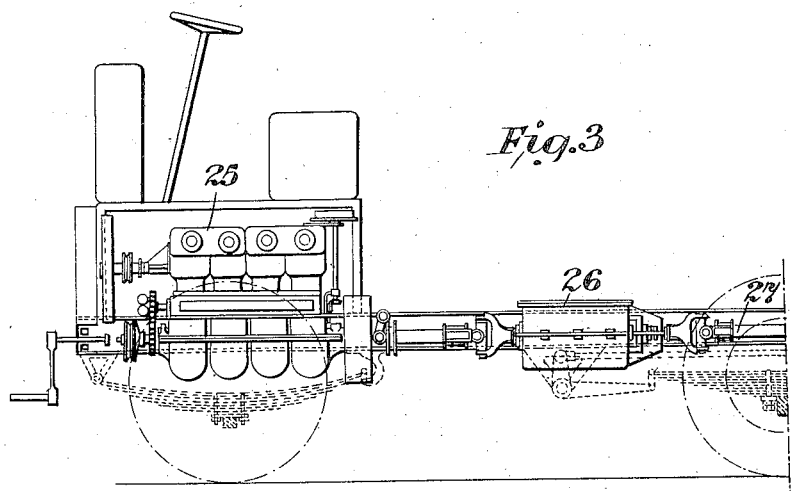

Fig. 1.ª
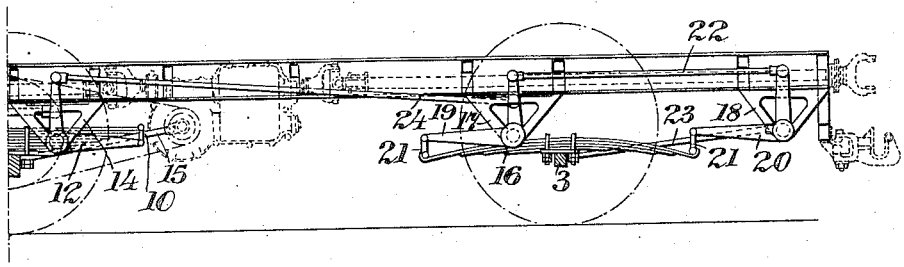
Fig. 3.ª
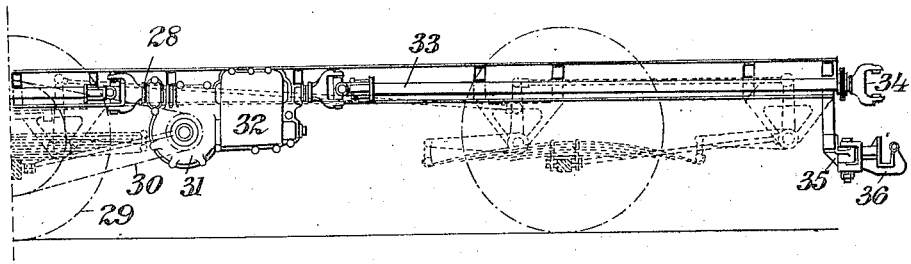

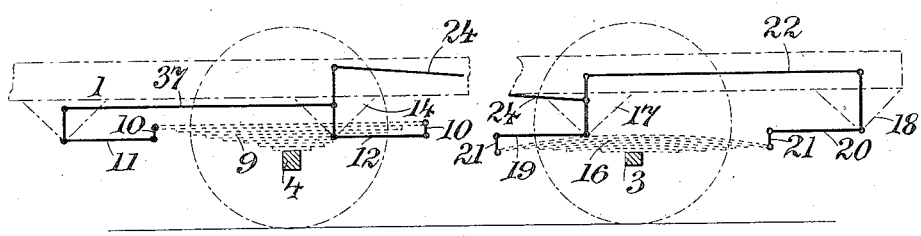
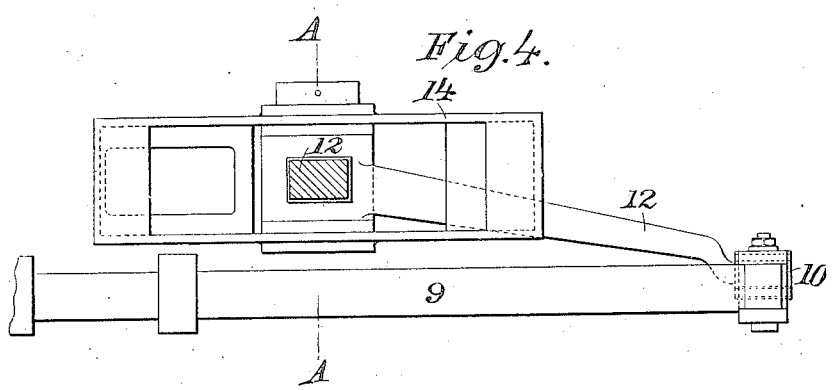
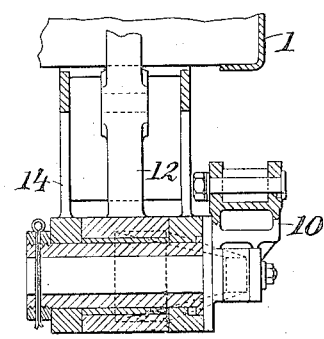

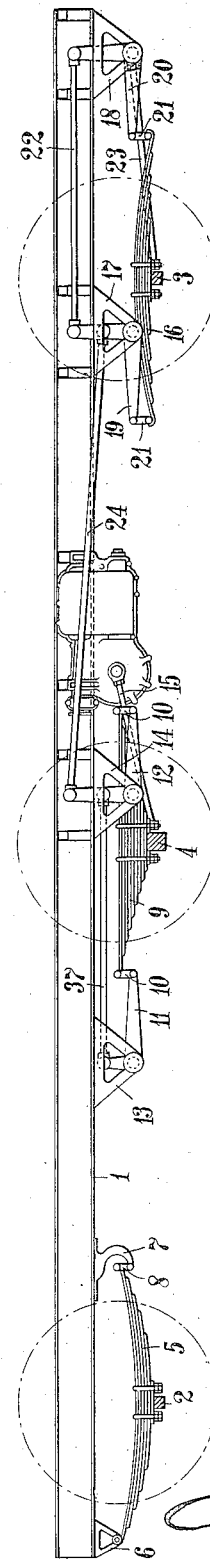

UNITED STATES PATENT OFFICE.

EDOUARD SURCOUF, OF BILLANCOURT, FRANCE, ASSIGNOR TO THE RENARD ROAD AND RAIL TRANSPORT CORPORATION, LIMITED, OF LONDON, ENGLAND, A CORPORATION OF GREAT BRITAIN.

MOTOR ROAD-VEHICLE.

No. 914,201.      Specification of Letters Patent.      Patented March 2, 1909.

Application filed February 29, 1908. Serial No. 418,556.

*To all whom it may concern:*

Be it known that I, EDOUARD SURCOUF, a citizen of the Republic of France, residing at Billancourt, France, have invented certain new and useful Improvements in Motor Road-Vehicles, of which the following is a specification.

This invention relates to motor road vehicles and provides a six-wheeled motor road vehicle, of large capacity for transport purposes and designed to avoid slip, the said vehicle being suspended in such a manner as to insure always a reasonable distribution of the load over the axles whatever be the irregularities in the surface of the ground. The said vehicle is moreover adapted to be coupled to a following vehicle and to propel the same by driving through the motor shaft.

In the accompanying drawing:—Figure 1 and Fig. 1ª represent the chassis of the motor vehicle in longitudinal section as a whole, the parts which serve for driving and for the transmission of power being shown in broken lines, while the parts used in the suspension are in full lines. Fig. 2 is a diagram of the method of suspension of the said vehicle. Fig. 3 and Fig. 3ª represent a longitudinal section of the chassis showing the parts which serve for driving and for the transmission of power in full lines, those used for suspension being drawn in broken lines. Fig. 4 shows in plan and to a larger scale, the method of mounting one of the double suspension-levers supporting the end of the springs. Fig. 5 is an elevation, in transverse section on the line A A, Fig. 4. Fig. 6 is a view in side elevation illustrating the completely assembled vehicle suspension in accordance with the present invention.

The chassis 1 is provided with three axles 2, 3, 4; the front axle 2 and rear axle 3 are steering axles and are controlled by the common steering wheel, the middle axle 4 is the driving axle.

In order that the load may be always reasonably distributed over the axles, whatever be the irregularities in the surface of the ground, the chassis 1 is suspended in the following manner, that is to say:—The springs 5 bearing the front axle 2 are connected, as usual, to the chassis 1 by means of the brackets 6 and 7 and of the suspension links or shackles 8. The ends of the springs 9 of the middle axle 4 are connected by links or shackles 10 to bell crank levers 11, 12 jointed respectively to corresponding brackets 13, 14 mounted on the longitudnal members of the chassis 1, the said levers 11, 12 being united by a connecting rod 37; moreover, in order to avoid longitudinal movement of the axle 4, the latter is guided by a connecting rod 15 fixed at one end to the chassis, and at the other end to the axle. Said rod 15 also acts to keep the driving chain taut.

The springs 16 of the rear steering axle 3 are also connected to brackets 17, 18 mounted on the longitudinal members of the frame by means of bell crank levers 19, 20 and links 21, the said levers 19, 20 being braced by the rod 22; the rear axle 3, like the middle axle 4, is moreover retained longitudinally by a connecting rod 23 jointed to the frame.

The suspension systems of the middle and rear axles are connected by a rod 24 which is jointed at one end to the lever 12 and at the other end to the lever 19; it results therefrom that when one of these axles approaches the chassis, by reason of the irregularities in the level of the ground, the other tends to move away, and vice versa.

The length of the arms of the levers 12 and 19, to which is jointed the rod 24, is such that the middle axle 4 supports a heavier load than the other axles, in order to insure more adhesion.

The propelling effort is transmitted from the motor 25 to the change-speed gear 26 and from thence through the Cardan shafts 27, 28 to the central driving wheels 29 by means of the chain 30, the differential gear 31 which is itself driven for example by a two-speed train being arranged in the gear-case 32 and forming a reduction-gear complementary to the change-speed gear 26.

The shaft 28 extends through the gear-case 32 and controls, through a Cardan joint, a shaft 33 which extends to the rear of the frame 1 and bears at its rear end a Cardan joint 34; the last transverse member of the frame 1 also bears a piece 35 on which is jointed a false coupling rod 36 in such a manner that, as required, it is possible to couple behind the driving vehicle a following vehicle of which the steering rod hooks on to the false coupling bar 36, and which takes the power required for its propulsion from the terminal Cardan joint 34. This following vehicle may have an ordinary chassis with three or two axles.

In the case where the motor vehicle is to be used alone, the Cardan joint 34 and its driving shaft 33 as well as the false coupling bar 36 may be dispensed with.

Finally, if, as shown in the accompanying drawing, the suspension-springs of the axles are placed beneath the longitudinal members of the chassis 1, it is necessary, in order to have a sufficient range of deflection, to adopt for the spring 16 of the rear axle 3, the arrangement as shown where the curvature is reversed.

What I claim is:—

1. A motor road vehicle including a frame, two axles, springs supporting said axles, bell crank levers pivotally mounted on said frame and each having an arm coupled to one end of one of said springs, the arms for the one axle springs extending in the opposite direction to the arms for the other axle springs, links coupling the second arms of each pair of levers, links coupling the second arm of one of the first-named axle levers to the second arm of one of the second axle levers on each side of the vehicle, and means for connecting said axles to said frame so as to prevent movement of said axles in the longitudinal direction of said vehicle.

2. A motor road vehicle including a frame, two axles, springs supporting said axles, bell crank lever systems, a rod connecting corresponding arms of the levers of each system, each system supporting one of the springs of said respective axles and the levers supporting the springs of one axle having their substantially horizontal arms extending in the opposite direction to the corresponding arms of the levers supporting the springs of the other axle, a link pivotally connecting the substantially vertical arms of the adjacent levers of the systems, and substantially longitudinally extending links connecting said axles to said frame.

3. A motor road vehicle including a frame, two axles, springs supporting said axles, bell crank lever systems, a rod connecting corresponding arms of the levers of each system, each system supporting one of the springs of said respective axles, the levers supporting the springs of one axle having their substantially horizontal arms extending in the opposite direction to the corresponding arms of the levers supporting the springs of the other axle, a link pivotally connecting the substantially vertical arms of the adjacent levers of the systems, the points where the said connecting link of the systems is jointed being such that the first named axle supports a heavier load than the other axle, and substantially longitudinally extending links connecting said axles to said frame.

4. In vehicle suspensions of the type set forth, in combination, a chassis, two axles, springs carried by the axles and means for suspending the axles from the chassis comprising brackets secured to the chassis, bell crank levers having upwardly extending arms and horizontal arms extending inwardly toward one another, each lever being pivoted to a bracket and having its horizontal arm pivoted to the adjacent spring and a link connecting the vertical arms of said levers.

5. In vehicle suspensions of the type set forth in combination a chassis, axles suspended therefrom, springs carried by the axles, and means for suspending the axles from the chassis comprising brackets secured to the chassis, bell crank levers arranged in pairs, each pair of said levers being similarly disposed and having their horizontal arms connected to the ends of a correspondingly located spring, a rod connecting the bell crank levers of each pair, said levers as pairs having their horizontal arms extended oppositely, and a link connecting the vertical arms of the adjacent levers of the pairs.

6. In vehicle suspensions of the type set forth, in combination, a chassis, three axles suspended therefrom, springs carried by said axles, the springs of one of the end axles being connected to the chassis, and means for suspending the other axles from the chassis comprising brackets secured to the chassis, bell-crank levers arranged in pairs, each pair of such levers being similarly disposed and having their horizontal arms connected to the ends of a correspondingly located spring, a rod connecting the bell-crank levers of each pair, said levers as pairs having their horizontal arms extending oppositely, and a link connecting the vertical arms of the adjacent levers as pairs.

In testimony whereof I have hereunto set my hand in presence of two subscribing witnesses.

EDOUARD SURCOUF

Witnesses:
P. T. SANES,
L. BAFFIER.